Figure 3:
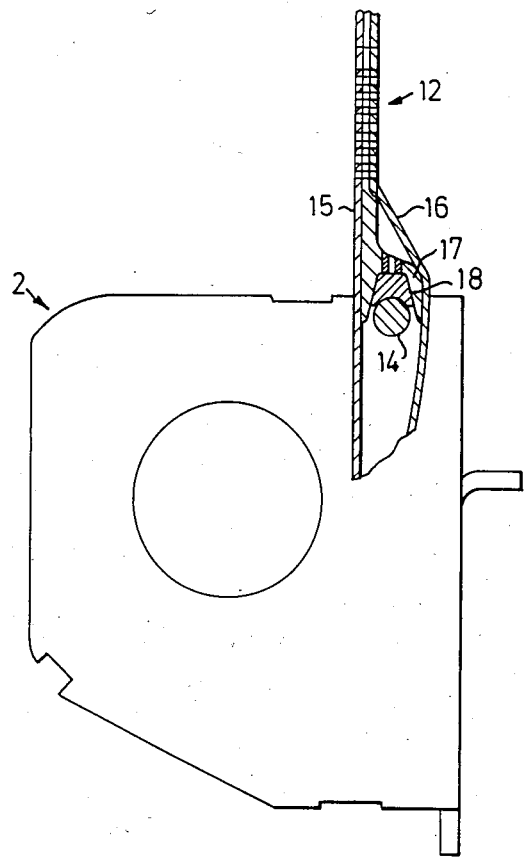

United States Patent [19]

Carlstedt

[11] Patent Number: 4,583,762
[45] Date of Patent: Apr. 22, 1986

[54] SAFETY BELT FOR MOTOR VEHICLES
[75] Inventor: Hans Carlstedt, Partille, Sweden
[73] Assignee: AB Volvo, Goteborg, Sweden
[21] Appl. No.: 658,805
[22] Filed: Oct. 9, 1984
[30] Foreign Application Priority Data Oct. 14, 1983 [SE] Sweden .................................. 8305660

[51] Int. Cl.4 .............................................. A62B 35/00
[52] U.S. Cl. .................................... 280/801; 280/807; 280/808; 297/474; 297/483
[58] Field of Search ................ 297/468, 469, 474, 475, 297/479, 483; 280/801, 802, 803, 807, 806, 808; 242/107, 107.13, 107.4 A

[56] References Cited

U.S. PATENT DOCUMENTS 4,223,917 9/1980 Mori et al. ......................... 280/806
4,506,912 3/1985 Ahad .................................. 280/808

FOREIGN PATENT DOCUMENTS 0067968 12/1982 European Pat. Off. .
2551642 6/1977 Fed. Rep. of Germany .
1577951 10/1980 United Kingdom .

Primary Examiner—Richard A. Bertsch
Attorney, Agent, or Firm—Young & Thompson

[57] ABSTRACT

The invention relates to a three-point reel belt for motor vehicles of the type in which both the chest webbing and the lap webbing are joined to reel mechanisms. The take-up reel mechanism for the chest webbing has a larger reel and stores a shorter webbing length than the reel mechanism for the lap webbing. The chest webbing and the lap webbing are made as a continuous webbing, on which a tongue plate can be slid, whereby the webbing can only be fed out from the lap webbing reel mechanism when putting on the belt.

8 Claims, 3 Drawing Figures

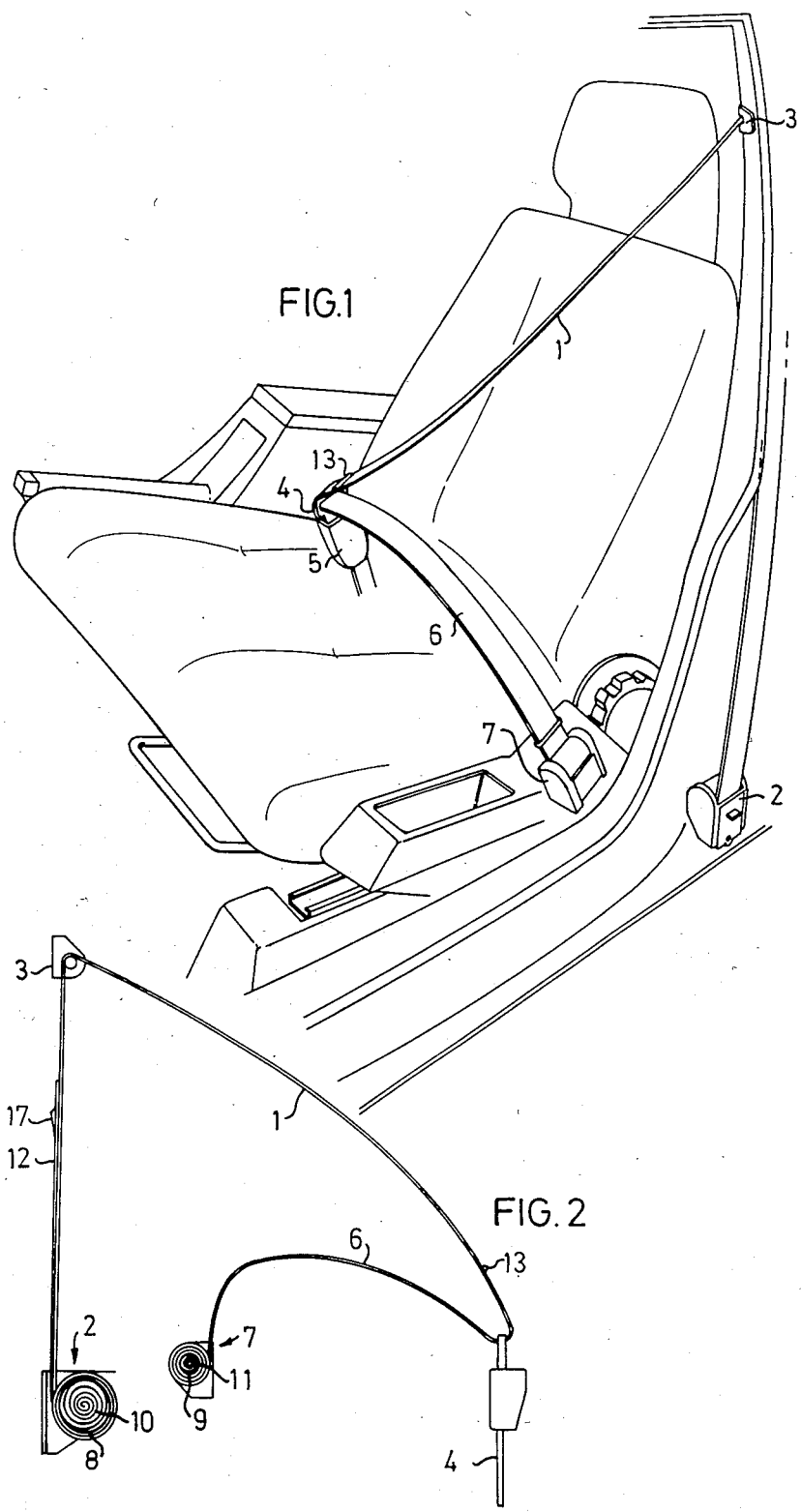

SAFETY BELT FOR MOTOR VEHICLES

The present invention relates to a safety belt for motor vehicles, comprising a lap webbing and a chest webbing, each of which has one end joined to an individual take-up mechanism which, in opposition to the take-up force, permits extension of the active portion of each webbing.

In the most common type of three-point reel belts, the chest webbing is joined either directly or via a redirecting fitting, with a take-up for excess webbing, which contains a reel which is spring-loaded in the take-up direction and a locking mechanism controlled by the acceleration in the roll-out direction. In order to make it possible for people of different sizes to use the belt and to be able to compensate for various seat positionings (forward-backward, upward-downward) and for the various seat-back inclinations, the reelable length of webbing on the reel must be relatively long. The problem is, however, that if the webbing length is sufficient to provide full freedom of movement when the seat is moved forward, then the risk of injury is increased when the seat is used in normal intermediate positions or positions farther back because there is then too much webbing on the take-up reel. The relatively loosely wound webbing on the reel is pulled tight in a collision, i.e. there is a so-called "film-reel effect", which means that webbing will be fed out from the locked reel. This feed-out, which can amount to 5-10 cm, together with the normal stretching of the webbing will result in a folding forward of the person's upper body with a risk of hitting one's head against the steering wheel and instrument panel. This is due to the fact that the web friction against the person's body prevents an even distribution between forward movement of the upper body and the lower body.

Safety belt systems are also known which use take-up reels for both the chest webbing and the lap webbing. These safety belt systems, which are particularly intended for trucks with spring-suspended seats have, in order to compensate for the spring movement of the seat relative to the body, two identical take-up reels from both of which webbing is paid out when the safety belt is put on. Since this type of belt must be able to compensate not only for different body sizes and seat setting but also for the spring movement of the seat, both take-up reels must be able to store relatively long lengths of webbing. When the belt has been put on, the lap webbing and the chest webbing apply a pressure to the person, and especially the pressure from the chest webbing is particularly uncomfortable.

The purpose of the present invention is, starting from the above-mentioned seat belt system provided with two identical take-up mechanisms, to provide a seat belt system without the disadvantages of the conventional systems with one take-up mechanism.

This is achieved according to the invention by virtue of the fact that the belt has buckle means so arranged and the webbing lengths are so distributed between the take-up mechanisms that when putting on the belt, webbing can only be fed out of the take-up mechanism for the lap belt.

Instead of using as previously the take-up reel for the chest webbing for storage and for providing the required length of webbing, according to the present invention the lap belt take-up mechanism is used for this purpose, and a tongue plate which is displaceable on the webbing makes possible a suitable distribution of the webbing length which is fed out. The take-up reel for the lap webbing need only store that length of webbing which is needed to compensate for various seat positions and body sizes, but not to provide freedom of movement. The length of webbing needed for this is stored on the take-up reel for the chest webbing and can be relatively short, about 20 cm for example. Thus, the previously mentioned film-reel effect is reduced substantially at the same time as freedom of movement comfort is provided regardless of the seat position or the size of the passenger. Since all the webbing can be taken from the lap take-up reel when putting on the belt and the chest take-up reel is kept in the end position, the additional advantages achieved at the chest webbing does not exert any direct pressure on the chest when sitting normally, only when the person lifts his back from the seat back.

The invention will be described below with reference to an example shown in the accompanying drawings, of which FIG. 1 shows a schematic perspective view of a driver seat with a safety belt according to the invention, FIG. 2 shows the principle of the safety belt according to the invention and FIG. 3 shows a side view of the chest webbing take-up reel with a porton of the webbing in longitudinal section.

The safety belt according to the invention is made in a conventional manner with a chest webbing 1, which runs in the position for use from a reel mechanism 2 via a redirecting fitting 3 diagonally across the seat to a tongue plate 4, which in the buckled position is inserted in a buckle 5 at the end of a short strap between the seats. The tongue plate 4 is also joined to a lap webbing 6, which runs from a reel mechanism 7 anchored in the body beside the seat. The chest webbing 1 and the lap webbing 6 are made in a continuous webbing, which runs through an eye in the tongue plate 4. The lengths of the active portions of the chest webbing 1 and the lap webbing 6, i.e. the portion between the redirecting fitting 3 and the tongue plate 4 and the portion between the tongue plate 4 and the reel mechanism 7 can thus be varied by feeding out varying amounts of webbing from the respective reel mechanism in combination with displacing the webbing through the eye of the tongue plate 4. So much is stored in the reel mechanism 7 that all webbing can be taken from this mechanism when putting on the belt. On the chest webbing there is a stopper 13 which limits how far the tongue plate 4 can be slid up the chest webbing. This is to prevent the person in the seat from feeding out webbing from the chest reel mechanism 2 when putting on the belt.

Only a short length of webbing need be stored on the reel 8 of the take-up mechanism 2, for example about 20 cm to provide full freedom of movement, which means that the reel 8 can have a larger diameter than the reel 9 of the take-up mechanism 7, as can be seen in FIG. 2. The combination of short webbing and large reel has the result that the feed-out from the reel mechanism 2 due to the so-called film-reel effect will be negligible in a collision. By virtue of the fact that only a small length of webbing need be stored in the take-up mechanism 2, the webbing can be reinforced over a portion of its length, e.g. by being made double, as is indicated at 12 in FIG. 2. This results in reduced stretching, which in combination with a minimal film-reel effect further reduces the forward throw of the body in a collision.

As was mentioned above, webbing can be fed out of both take-up mechanisms to extend the effective webbing portions, but in order to automatically assure that no webbing is fed out from the chest take-up mechanism 2 when the belt is put on normally, the reel 8 of the take-up mechanism 2 can be wound by a spring 10 which exerts a greater take-up force on the reel 8 than the force exerted by the corresponding spring 11 on the reel 9 of mechanism 7. The spring distance of spring 10 can be shorter than that of spring 11.

In order to provide the chest webbing 1 with a definite end position when retracted, a stopper is provided which is shown in more detail in FIG. 3. The stopper is composed firstly of a pin 14 fixed at the entrance to the housing of the take-up mechanism 2, said pin lying between the two web portions 15,16 of the double web 12, and secondly a plastic body 17 which is sewn fast by means of the seam which joins the web portions 15,16 to each other. The plastic body carries a shock-absorbing abutment 18 of rubber for example. The web portions are thus not joined to each other over a portion which corresponds to the maximum feed-out length of the take-up mechanism. The advantage of this arrangement of the stopper is that there are no parts protruding from the web which can catch on the interior of the vehicle. The stopper sees to it that the take-up mechanism 2 does not pull on the chest web when the person in the seat assumes a normal sitting position.

The take-up mechanisms 2 and 7 are provided with conventional "inertia lock" blocking mechanisms (not shown).

Since it is sufficient to have a relatively small excess of chest webbing, the take-up mechanism 2 described can be replaced within the scope of the invention with a spring-loaded telescoping device with a blocking mechanism which locks when the webbing feedout exerts a certain rate.

What I claim is:

1. A safety belt for motor vehicles, comprising a lap webbing and a chest webbing, the lap webbing having one end joined to a first individual take-up mechanism, the chest webbing having one end joined to a second individual take-up mechanism separate from said first take-up mechanism, each said take-up mechanism in opposition to the take-up force permitting extension of the active portion of each webbing, both said take-up mechanisms being disposed on the same side of a vehicle seat, the webbing length which can be taken up by the chest webbing take-up mechanism being substantially shorter than the webbing length which can be taken up by the lap webbing take-up mechanism, and means to feed out webbing only from the lap webbing take-up mechanism when putting on the belt.

2. Safety belt according to claim 1, characterized in that the lap webbing and the chest webbing are made as a continuous webbing and that the buckle means comprise a tongue plate, which is at least limitedly displaceable along the webbing.

3. Safety belt according to claim 2, characterized in that the webbing is provided with a stop means which limits the displacement of the tongue plate in the direction towards the take-up mechanism for the chest webbing.

4. Safety belt according to claim 1, characterized in that at least that portion of the chest webbing which can be taken up by the take-up mechanism is reinforced in relation to the rest of the webbing.

5. Safety belt according to claim 1, characterized in that the chest webbing and its take-up mechanism have cooperating means which form a defined stopper which determines the maximum webbing length which can be taken up.

6. Safety belt according to claim 5, characterized in that at least that portion of the chest webbing which can be taken up by the take-up mechanism is reinforced in relation to the rest of the webbing and in that the chest webbing is doubled along its reinforced portion and that the stopper is formed by a pin located between the web portions and joined to the take-up mechanism, and an abutment placed between the webbing portions and fixed to the webbing portions.

7. Safety belt according to claim 1, characterized in that the take-up mechanisms are reel mechanisms with reels which are spring-loaded in the take-up direction, the reel mechanism for the chest webbing having a reel of greater diameter than the reel for the lap webbing.

8. Safety belt according to claim 7, characterized in that the springs of the reel mechanisms are dimensioned so that the take-up force acting on the chest webbing is greater than the take-up force acting on the lap webbing.

* * * * *